United States Patent [19]

Kato et al.

[11] Patent Number: 4,635,122
[45] Date of Patent: Jan. 6, 1987

[54] IMAGE PICKUP DEVICE OF THE FRAME TRANSFER TYPE AND IMAGE PICKUP ARRANGEMENT USING THE SAME

[75] Inventors: Toshio Kato; Takao Kinoshita, both of Tokyo; Akihiko Tojo, Yokohama, all of Japan

[73] Assignee: Canon Kabushiki Kaisha, Tokyo, Japan

[21] Appl. No.: 842,742

[22] Filed: Mar. 17, 1986

Related U.S. Application Data

[63] Continuation of Ser. No. 541,698, Oct. 13, 1983, abandoned.

[30] Foreign Application Priority Data

Oct. 15, 1982 [JP] Japan ................................. 57-181809

[51] Int. Cl.[4] .............................................. H04N 3/14
[52] U.S. Cl. ...................................... 358/213; 357/24
[58] Field of Search .......................... 358/213, 209, 41; 357/24 LR; 250/578; 307/607; 377/57

[56] References Cited

U.S. PATENT DOCUMENTS

| | | | |
|---|---|---|---|
| 4,447,735 | 5/1984 | Horii | 357/241 LR |
| 4,496,982 | 1/1985 | Levine | 358/213 |
| 4,513,313 | 4/1985 | Kinoshita et al. | 358/44 |
| 4,547,677 | 10/1985 | Parker | 358/213 |

FOREIGN PATENT DOCUMENTS 128075 10/1981 Japan .

Primary Examiner—Gene Z. Rubinson
Assistant Examiner—Stephen Brinich
Attorney, Agent, or Firm—Fitzpatrick, Cella, Harper & Scinto

[57] ABSTRACT

An image pickup device of the frame transfer type having an image pickup array and a storage array each of which consists of a number of cells forming row and column, in which the number of cells in the horizontal direction of the storage array is twice or more times the number of cells in the horizontal direction of the image pickup array. This device has a switching apparatus for selectively transferring the information of each column of the image pickup array to one of a predetermined plurality of columns of the storage array.

23 Claims, 17 Drawing Figures

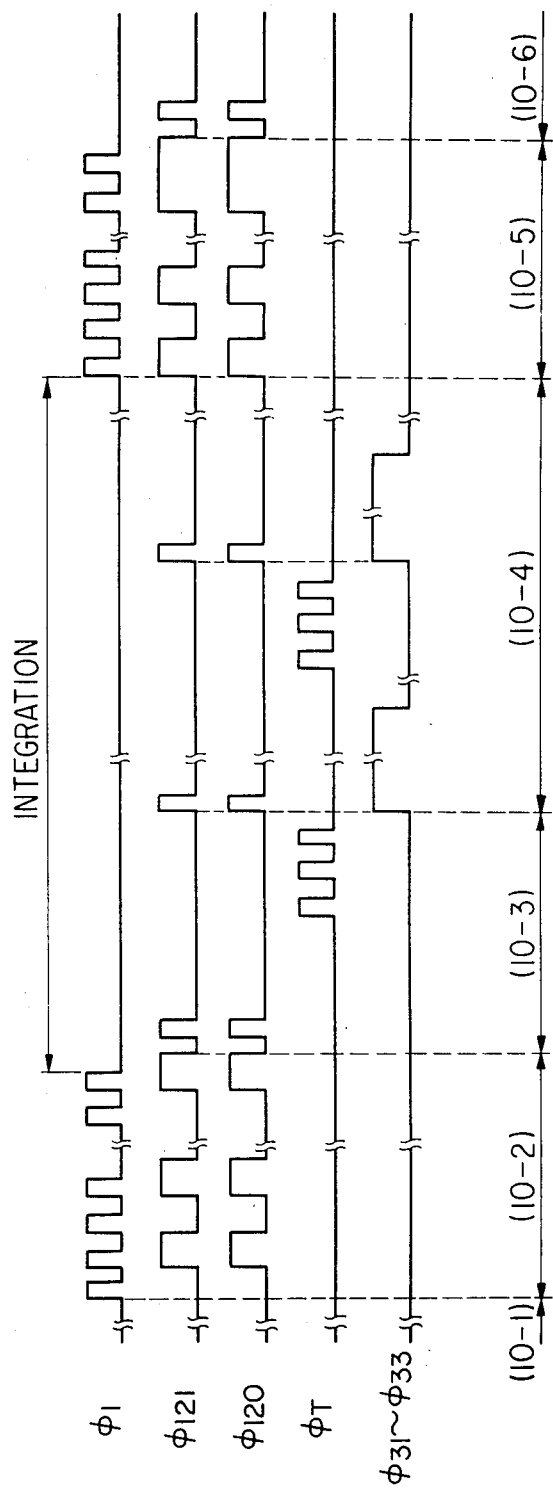

IMAGE PICKUP DEVICE OF THE FRAME TRANSFER TYPE AND IMAGE PICKUP ARRANGEMENT USING THE SAME

This application is a continuation of application Ser No. 541,698 filed Oct. 13, 1983 now abandoned.

BACKGROUND OF THE INVENTION

1. Field of the Invention

This invention relates to an image pickup device of the frame transfer type and an image pickup arrangement using this image pickup device of the frame transfer type which are suitable to picture a still image.

2. Description of the Prior Art

Generally, video signals of two so-called interlaced fields are required to obtain a still picture which is suitable for the standard television system using a solid state image pickup device.

However, with a CCD (charge coupled device) of the frame transfer type, such a readout method has been conventionally considered to be impossible. That is to say, referring to FIG. 1, there is shown a construction of a prior-art frame transfer type CCD, in which a reference numeral 1 denotes an image pickup array; 2 is a storage array; 3 is a horizontal transfer register as register means; 4 is an output amplifier; and 5 is a signal output terminal.

A reference character PS indicates a cell, and a plurality of such cells are arranged in rows and columns, thereby to constitute the image pickup array 1 and the storage array 2, respectively. Each cell PS has a charge transfer function in the vertical direction in the drawing and also has a horizontal transfer function in the horizontal transfer register 3.

Reference characters $\phi_1$-$\phi_3$ represent transfer clocks of the image pickup array, storage array and horizontal transfer section, respectively.

The portion other than the image pickup array, i.e. the hatched portion is shielded against the light.

In the prior-art CCD with such a construction, the image information incident upon the image pickup array is sampled by each cell and accumulated as charge information.

Thereafter by supplying the clocks $\phi_1$-$\phi_3$, the charge information of the image pickup array is transferred as it is to the storage array at high speed and is read out for a proper period of time.

Namely, after transferring the information of the storage array to the register 3 row by row, this row information is read out by the clock $\phi_3$ for one horizontal scan period, thereby sequentially obtaining the scanning line signals corresponding to the standard television signals. However, since the interlace of 2:1 is done in the standard television system, the different locations on the monitor screen are scanned for playback with respect to the first and second fields. Therefore, unless the video signals of two fields which were mutually interlaced at the time of picturing are obtained, such problems will be caused as a picture blur occurring upon playback and the resolution being reduced, or the like.

However, in a conventional frame transfer type CCD with such a construction as shown in FIG. 1, it is impossible to individually read out the fields bearing odd numbers and the fields bearing even numbers in the screen which has been once pictured.

SUMMARY OF THE INVENTION

The present invention was made in consideration of such problems in the prior-art technology. It is an object of the invention to provide an image pickup device in which a still image can be pictured with high resolution by adopting a novel construction for the storage array of a CCD of the frame transfer type.

Another object of the present invention is to provide an image pickup device of the frame transfer type which is cheap and provides secure operation and in which a still image can be pictured with high resolution by adopting a simple construction which enables the yield to be improved, and to provide an image pickup arrangement using this device.

Still another object of the invention is to provide a frame transfer type image pickup device in which upon readout of the information of the cells in the storage array, the transfer efficiency is raised in spite of an increase in the number of cells in the horizontal direction and the sampling and holding of the signals are easily performed, and to provide an image pickup device.

BRIEF DESCRIPTION OF THE DRAWINGS

FIG. 17 is a timing chart as a second example of the same.

DETAILED DESCRIPTION OF THE PREFERRED EMBODIMENTS

A construction of an image pickup device according to the present invention will now be described in detail hereinbelow with respect to an embodiment with reference to the drawings.

Figure 1:
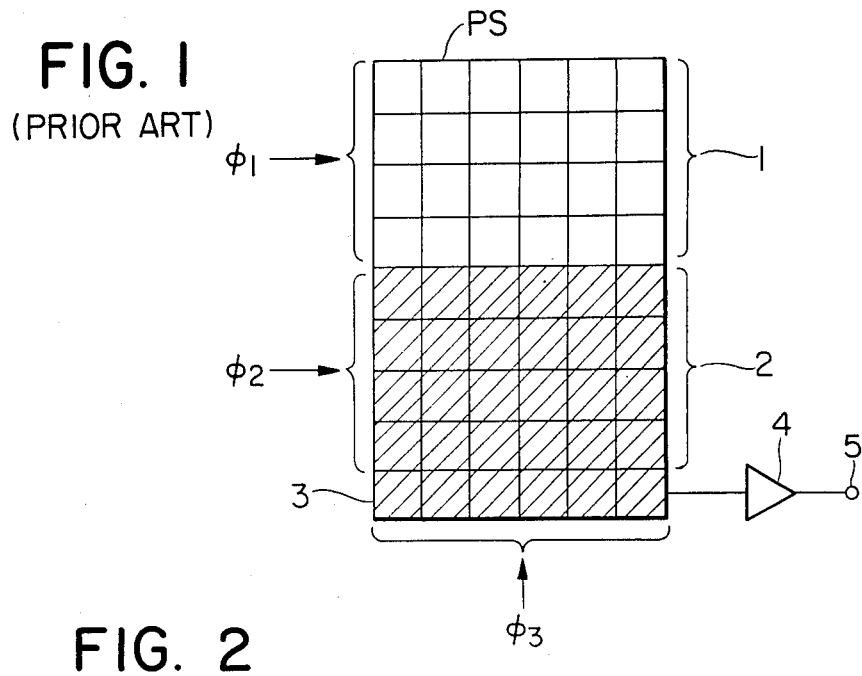
FIG. 1 is a diagram showing a construction of a prior-art image pickup device of the frame transfer type.
Figure 2:
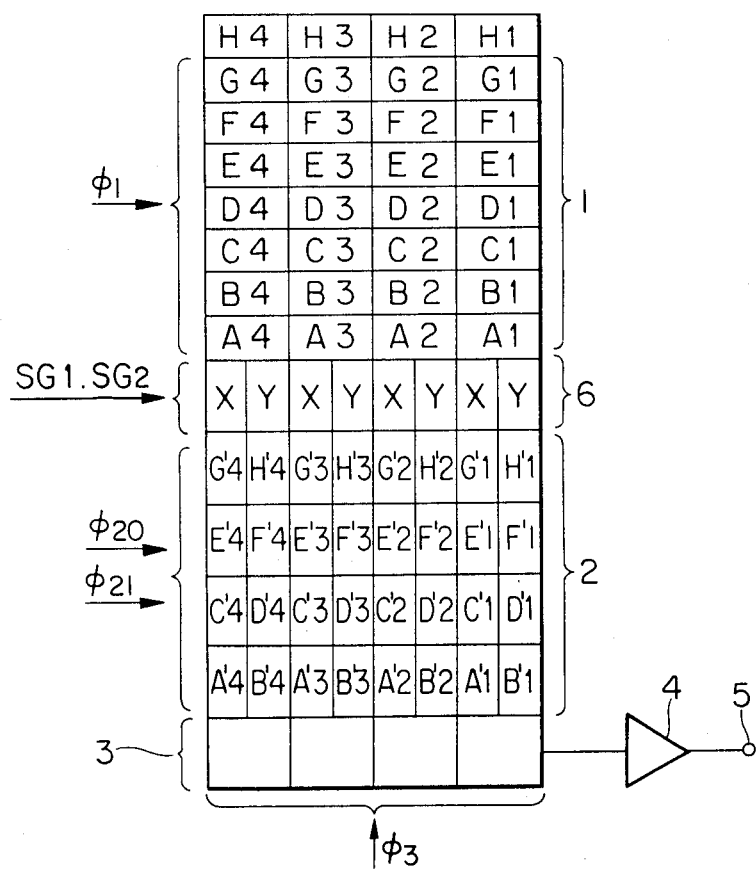
FIG. 2 is a diagrammatical view showing a construction of a first embodiment of an image pickup device of the frame transfer type of the present invention.

FIG. 2 shows a diagram to describe the construction of the first embodiment of the present invention, in which the same elements as those in FIG. 1 are designated by the same reference numerals. The number of cells in the horizontal direction of the storage array 2 is twice the number of photoelectric conversion cells in the horizontal direction of the image pickup array 1 (throughout the specification and claims, the terms "horizontal" and "vertical" are used, for convenience, to refer to directions having the relationship of the horizontal and vertical as shown in FIG 2). In this embodiment, although the number of cells in the vertical direction of the storage array 2 is one half of the number of cells in the vertical direction of the image pickup array 1, the number of cells in the horizontal direction of the storage array may be generally two or more times the number of those of the image pickup array and the number of cells in the vertical direction may be one half or more times those of the image pickup array.

Each charge accumulation cell of the storage array is arranged like a matrix in the row and column directions, and each column has a charge transfer function in the direction of column. A reference character $\phi_{20}$ denotes a clock to transfer the charges of the columns bearing even numbers (E columns) by seeing from the right in FIG. 2 in the storage array 2 in the direction of column. $\phi_{21}$ is a clock to transfer the charges of the columns bearing odd numbers ("O columns") by seeing from the right in the drawing in the storage array 2 in the direction of column.

A reference numeral 6 indicates a gate as gate means which according to the present invention, has the same number of cells as the number of cells in the horizontal direction of the storage array. Each cell is provided with a respective electrode (not shown). When a low-level voltage is applied to each of these electrodes, a potential barrier with a predetermined level is formed.

Furthermore, each cell of the gate 6 corresponds to a respective cell in the horizontal direction of the storage array 2.

Cells X of the gate 6 correspond to the E columns of the storage array, and cells Y correspond to the O columns. Therefore, when the potentials of the cells Y are higher and the potentials of the cells X are lower, the charge pockets (charges) of the image pickup array can be transferred to the E columns but are not transferred to the O columns.

In this way, by supplying gate control signals SG1 and SG2 to the electrodes of each of the cells X and Y of the gate 6, respectively, the transfer of the charges of the image pickup array to the storage array is selectively controlled.

Figure 3:
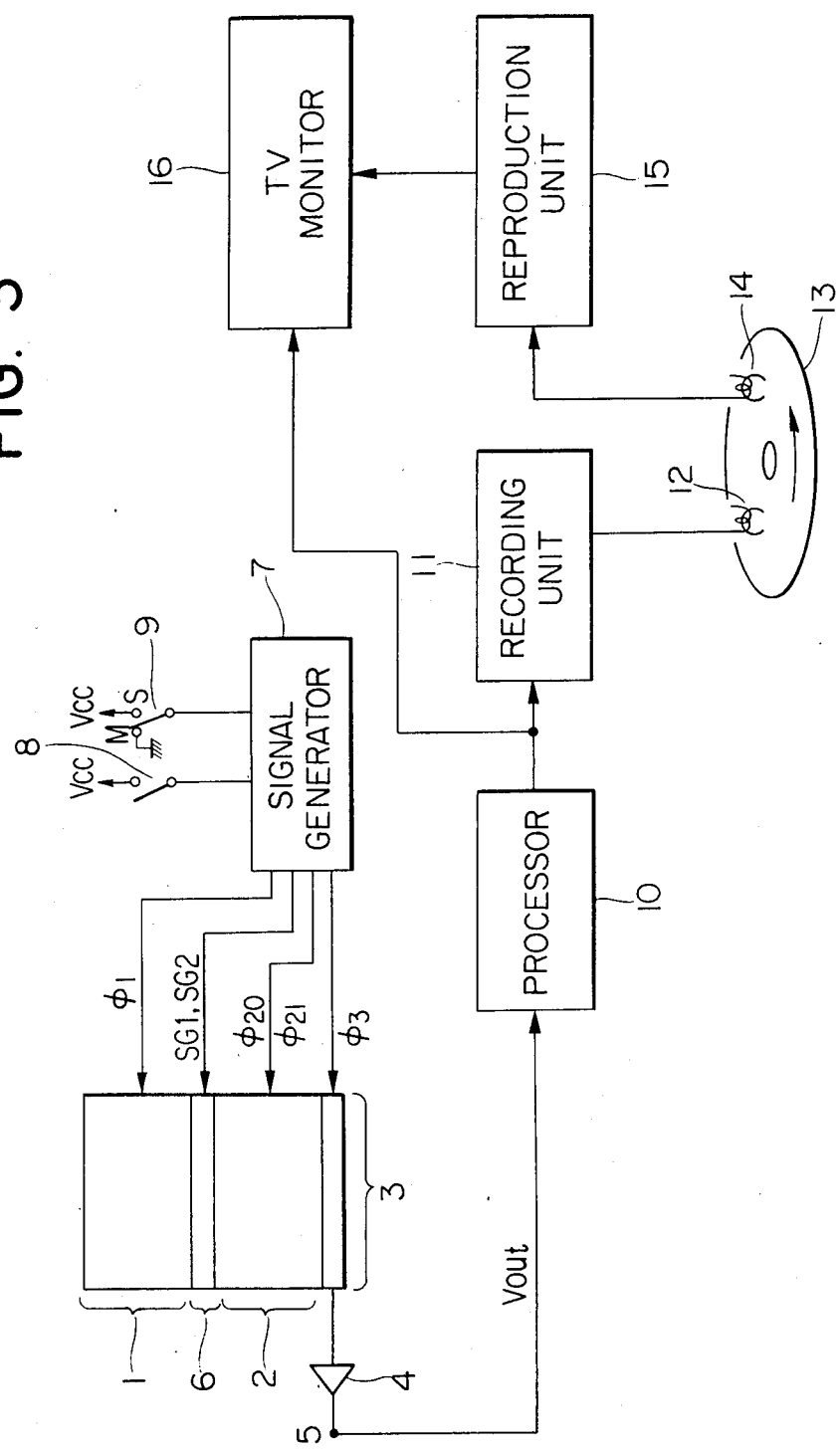
FIG. 3 is a schematic diagram showing an image pickup, recording and reproducing circuit system using the image pickup device of the present invention.

FIG. 3 shows a constructional diagram of the first embodiment of the image pickup, recording and reproducing system using the image pickup device of the present invention. In the drawing, a signal generator 7 to be actuated due to the operation of an image pickup trigger switch 8 forms timing signals as shown in FIGS. 4 or 5 in accordance with each mode of still (S) or movie (M) to be switched over by a mode selecting switch 9.

The video signal obtained through the output terminal 5 of the image pickup device is subjected to the signal processings such as sample and hold, $\gamma$ correction, aperture correction, etc., in a processor 10. Thereafter it is recorded on a recording medium 13 through a recording unit 11 for performing the modulation and the like and a recording head 12. In addition, the output of the processor 10 can be directly monitored by a TV monitor 16.

A numeral 14 indicates a playback head, and a signal picked up by this head is properly demodulated by a reproduction unit 15, and thereafter it can be also monitored by the TV monitor 16.

Figure 4:
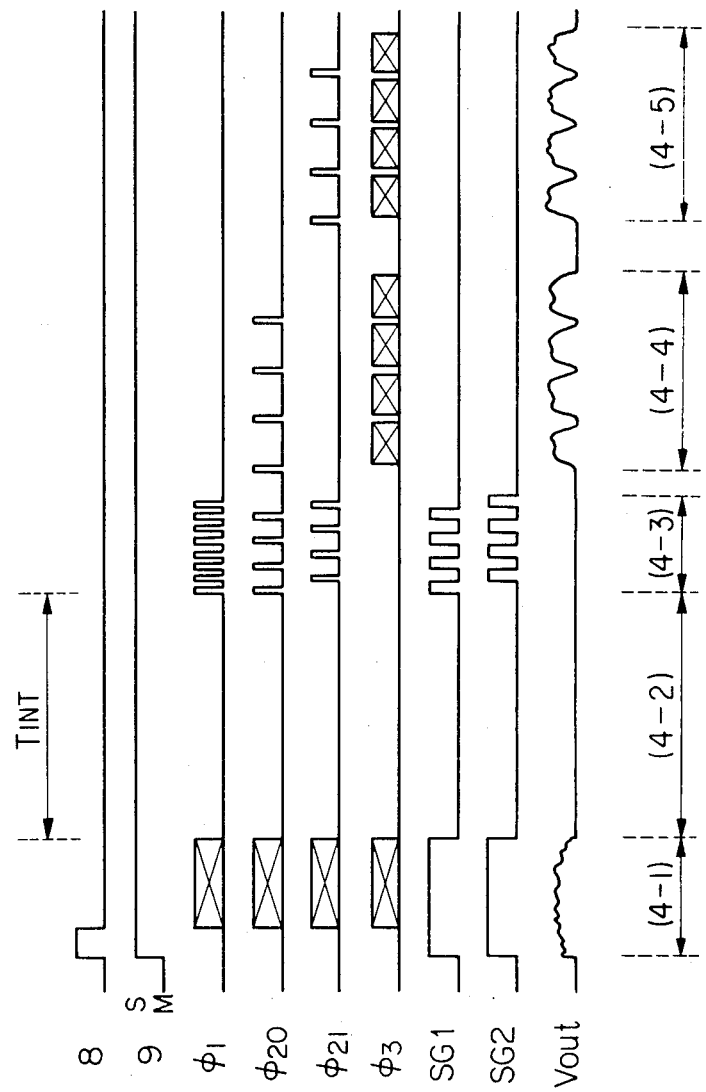
FIG. 4 is a timing chart when a still image is pictured using the circuit shown in FIG. 3.
Figure 5:
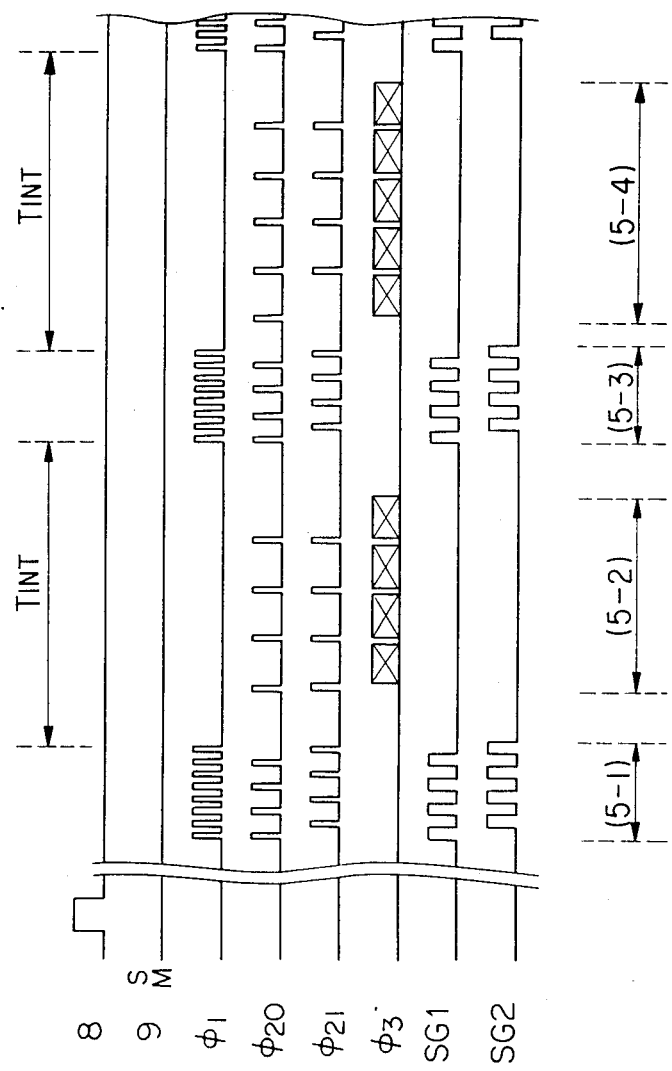
FIG. 5 is a timing chart when a moving image is pictured using the circuit shown in FIG. 3.

FIG. 4 is a diagram showing an example of the output timings of the signal generator 7 with the construction shown in FIG. 3. In the diagram, the pulses of the clocks $\phi_1$, $\phi_{20}$, $\phi_{21}$, and $\phi_3$, and gate signals SG1 and SG2 are constituted in such a manner that when they are at a higher level, the potential level for electrons in the image pickup device is lowered and when they are at a lower level, the potential level is raised. After the switch 9 has first been switched over to the still image pickup mode (S), when the image pickup trigger switch 8 is operated, the high-speed clocks $\phi_1$, $\phi_{20}$, $\phi_{21}$, $\phi_3$ are first supplied and the gate control signals SG1 and SG2 are together opened, thereby draining unnecessary charges [period (4-1)].

Next, when a predetermined accumulating period of time $T_{INT}$ has passed [period (4-2)], the charges of the image pickup array 1 are shifted downwardly in FIG. 2 one row by one by the clock $\phi_1$.

The signals SG1 and SG2 are respectively supplied such that the cells X of the gate 6 are opened for the information of the rows bearing odd numbers in the information of each row to be shifted and that the cells Y of the gate 6 are opened for the information of the rows bearing even numbers. At the same time, the clocks $\phi_{20}$ and $\phi_{21}$ are also alternately supplied as shown in FIG. 4 in accordance with the shifting operations of the off-number rows and even-number rows, respectively. Thus, the information of the odd-number rows of the image pickup array is stored in the E columns of the storage array, while the information of the even-number rows is stored in the O columns, separately [period (4-3)]. The state in which the information of one frame of the image pickup array was separately transferred to the storage array in this way is shown in FIG. 2. In FIG. 2, each reference numeral with a dash corresponds to the information of each cell of the image pickup array, respectively.

Next, in the period (4-4), the information stored in the E column in the information stored in the storage array 2 through the above-described process is read out by the clocks $\phi_{20}$ and $\phi_3$.

Thereafter, in the period (4-5), the information stored in the O columns of the storage array is sequentially read out by the clocks $\phi_{21}$ and $\phi_3$. As described above, according to the present invention, it is possible to read out the signal of one screen as the signals of the interlaced two fields.

FIG. 5 shows a timing chart of the output pulses of the signal generator in the case where the switch 9 is switched over to the movie image pickup mode (M). In FIG. 5, the information of the rows bearing odd numbers of the image pickup array is accumulated in the E columns and the information of the rows bearing even numbers is accumulated in the O columns, respectively, in the period (5-1) similarly to the timing of FIG. 4. In the period (5-2), by simultaneously shifting the information of the E columns and the information of 0 columns one row at a time respectively, the charging signals of both columns are added in each cell of the register 3. This added information is then read out through driving the register 3 by the clock $\phi_3$.

By repeating such a sequence, the information of the odd-number rows and the information of the even-number rows of the image pickup array are added two rows at a time, and they are read out as one-row information. In this case, the combinations of the rows which are added in the period (5-2) and read out are (A1-A4) and (B1-B4), (C1-C4) and (D1-D4), (E1-E4) and (F1-F4), and (G1-G4) and (H1-H4) in FIG. 2.

Thereafter by transferring again the information of the image pickup array to the storage array in the period (5-3), the charging currents formed in the image pickup array during the period of time from the period (5-1) to the period (5-3) are distributed and accumulated in the storage array in the same manner as the period (5-1).

Thereafter in the period (5-4), this accumulated information is read out while being added. At this time, the combination of the information to be added is changed by shifting the clocks $\phi_{20}$ and $\phi_{21}$ by one pulse.

Namely, in FIG. 5, since one pulse of the clock $\phi_{20}$ is output before the clock $\phi_{21}$, (A1-A4) of the image pickup array is read out as it is without being added, and (B1-B4) and (C1-C4), (D1-D4) and (E1-E4), and (F1-F4) and (G1-G4) are respectively added and are read out as one-row information. Finally, (H1-H4) is read out as one-row information.

Therefore, there is an interlaced relation between the signal to be read out in the period (5-2) and the signal to be read out in the period (5-4).

Furthermore, the sensitivity of the image pickup device will be also improved since the charge information of two rows is added. As described above, according to the present invention, it is possible to easily obtain the interlaced image signal with high sensitivity at the time of continuous picturing.

In addition the frame transfer type image pickup device of the present invention has a larger aperture ratio of the image pickup array than that of the image pickup device of the MOS X-Y address type or the like; therefore, the present device has the effect such that a still image signal with remarkable brightness and high resolution is obtained.

Figure 6:
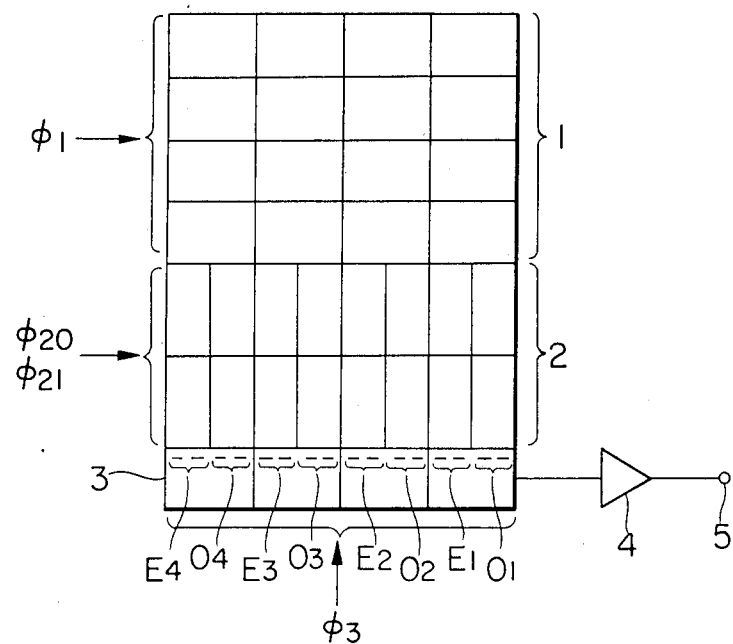
FIG. 6 is a diagram showing a second embodiment of the image pickup device of the present invention.

FIG. 6 is a diagram showing the second embodiment of the image pickup device of the present invention. In this embodiment, the gate 6 between the image pickup array 1 and the storage array 2 is omitted from the embodiment of FIG. 2. The same elements as those shown in FIG. 2 are designated by the same reference numerals.

Figure 7:
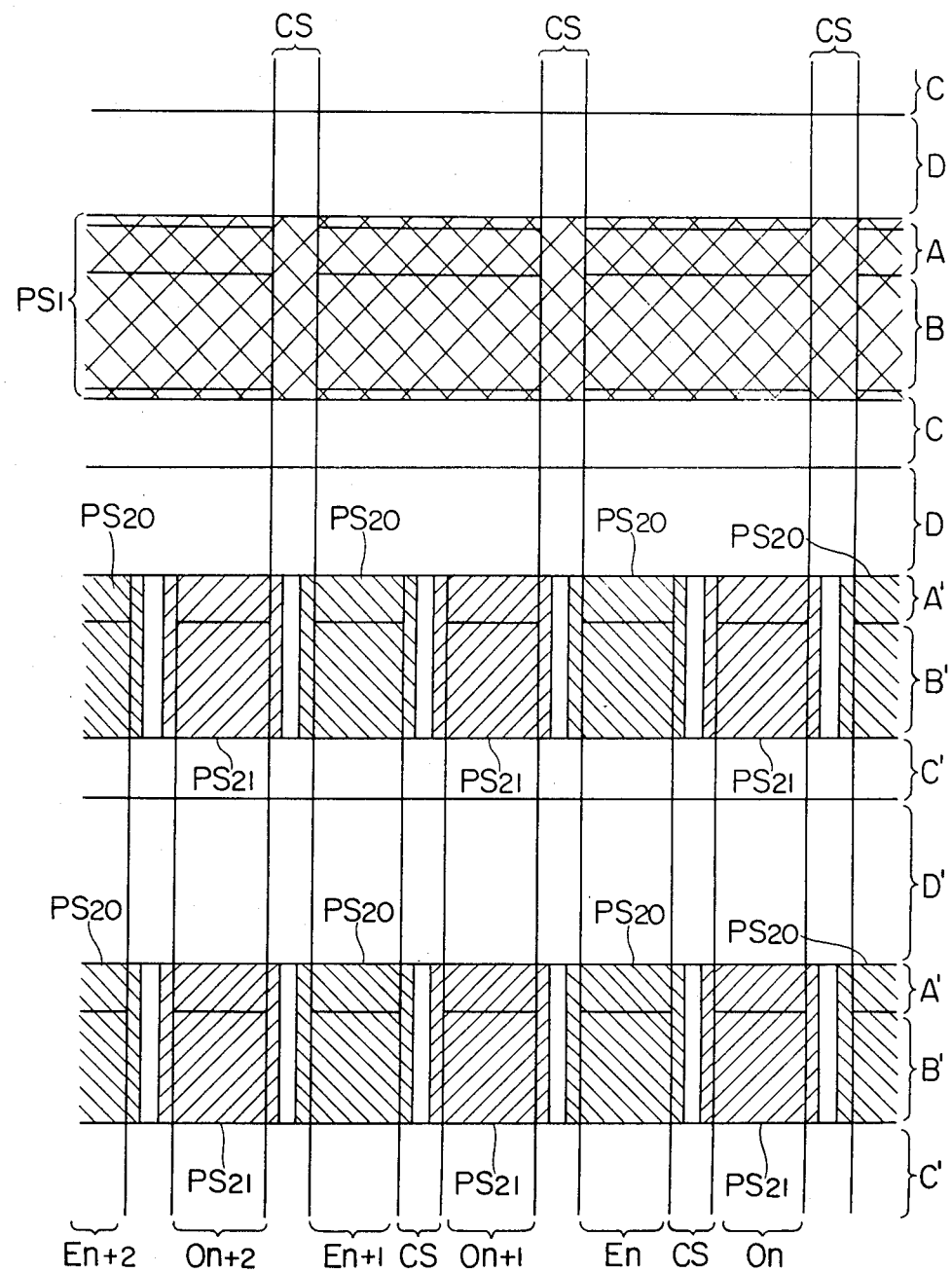
FIG. 7 is a diagram showing a construction of the main part of the image pickup device shown in FIG. 6.

FIG. 7 is a schematic diagram of the electrode arrangement of the main part of the second embodiment, in which this embodiment illustrates an example of the single-phase drive. In the drawing, a reference character CS denotes a channel stopper and PS1 indicates a poly-silicon electrode for supplying the clock $\phi_1$ to the image pickup array 1. This electrode covers the surfaces of regions A and B having different potential levels in the semiconductor substrate.

Reference characters PS20 and PS21 represent electrodes which cover the surfaces of regions A' and B' having different potential levels in the storage array.

These electrodes serve to apply the clocks $\phi_{20}$ and $\phi_{21}$ to the E columns and 0 columns, respectively.

Regions C and D of the image pickup array and regions C' and D' of the storage array are virtual electrode regions each having a fixed potential level which are formed in the semiconductor substrate due to the ion implantation or the like, respectively. Such a virtual electrode construction is as disclosed in, for example, Japanese Patent Laid-Open Gazette No. 11394 of 1980.

The potential levels P(A), P(B), P(C), P(D), P(A'), P(B'), P(C'), and P(D') for electrons of each of the regions A, B, C, D, A', B', C', and D' satisfy, for example, the following relations.

That is, $P(A)=P(A'), P(B)=P(B'), P(C)=P(C'),$
$P(D)=P(D').$

Figure 8:
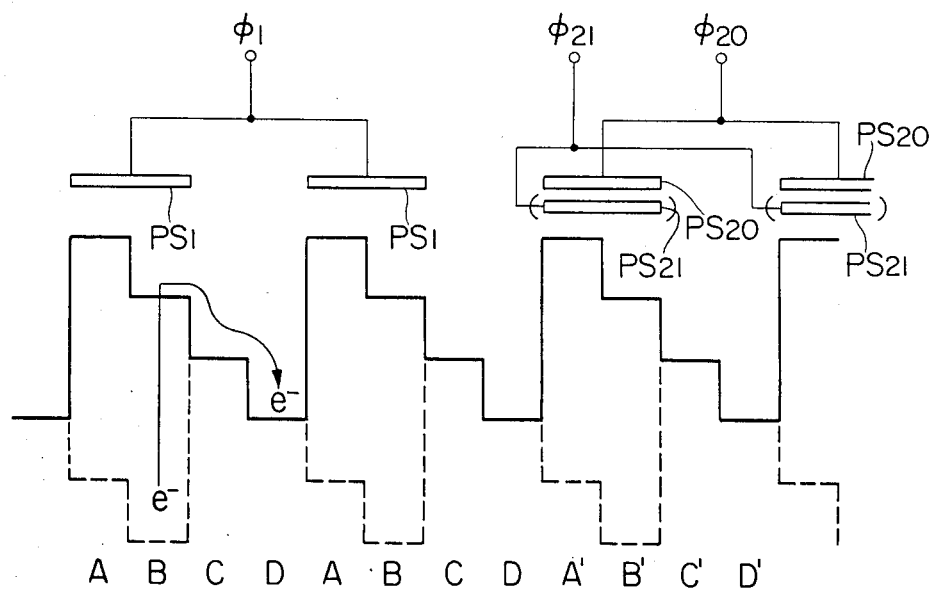
FIG. 8 is a diagram showing the potential state in the construction shown in FIG. 7.

On the other hand, when low-level signals are applied to the electrodes PS1, PS20, PS21, $P(A)>P(B)>P(C)>P(D)$ $P(A')>P(B')>P(C')>P(D')$ On the contrary, when high-level signals are applied to the electrodes PS1, PS20, PS21, $P(C)>P(D)>P(A)>P(B)$ $P(C')>P(D')>P(A')>P(B')$ FIG. 8 diagrammatically shows the states of such potential levels, in which the solid line indicates the state when low-level signals are applied to each electrode and the broken line shows the state when high-level signals are applied thereto. The virtual electrode regions C, D, C', and D' are always maintained to be a fixed potential.

Therefore, for example, when the clock $\phi_1$ is dropped to the low-level after it was once raised to the high level, the charges accumulated mainly in the region B are transferred to the region D at this trailing edge as shown in FIG. 8. Namely, the charges are transferred from B to D or from B' to D' at the trailing edge of the clock to each electrode.

The charges accumulated in the region D or D' are transferred to the region B or B' by raising each electrode to the high level. That is, the charges are transferred from D to B or from D' to B' at the leading edge of the clock.

The image pickup device of the second embodiment according to the present invention has such a construction as described above; therefore, it has an effect such that the information of each row of the image pickup array is alternately distributed to the 0 columns and E columns of the storage array by alternately supplying the clocks $\phi_{20}$ and $\phi_{21}$ synchronously with the clock $\phi_1$ instead of providing the gate 6 as shown in FIG. 2.

Figure 9:
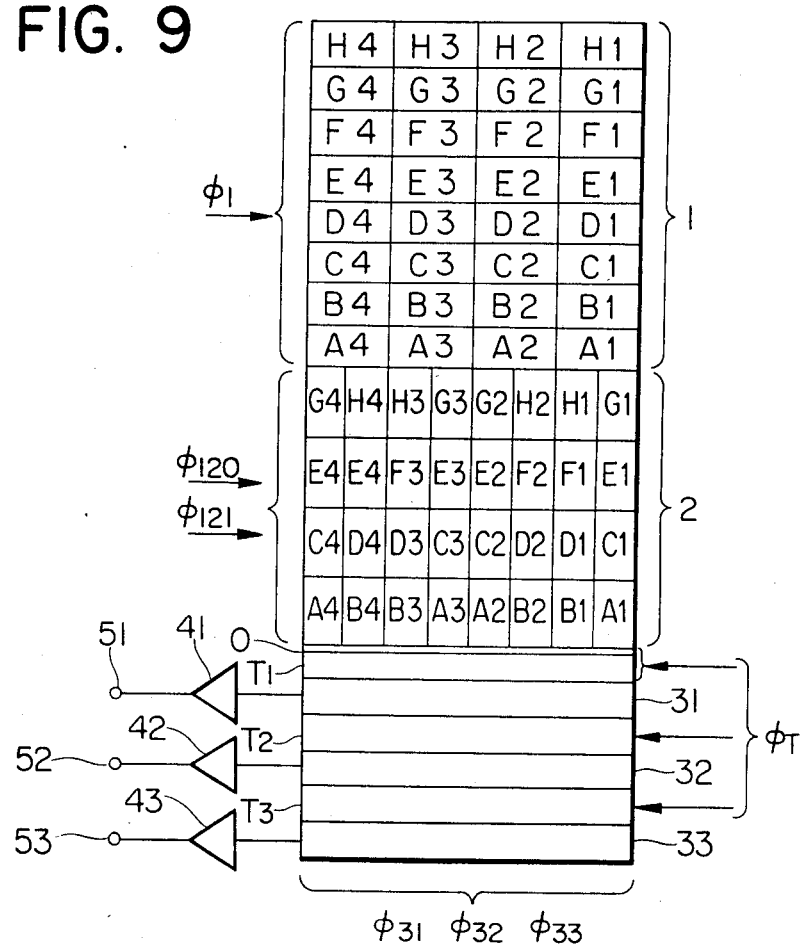
FIG. 9; is a diagrammatical view of a construction of a third embodiment of the image pickup device of the frame transfer type of the present invention.

FIG. 9 is an explanatory diagram showing the construction of the third embodiment of the present invention, in which the same elements as those shown in FIGS. 1 to 8 are designated by the same reference numerals. In this embodiment, the number of cells in the horizontal direction of the storage array 2 is twice the number of cells in the horizontal direction of the image pickup array 1, and the number of cells in the vertical direction of the storage array 2 is one half of the number of cells in the vertical diretion of the image pickup array 1.

In the embodiment shown in FIG. 9, the image pickup array 1 consists of picture elements of 8 rows×4 columns and the storage array 2 consists of picture elements of 4 rows×8 columns, although the actual numbers of picture cells are far larger than those numbers, Reference numerals 31 to 33 represent first to third horizontal shift registers, respectively. Each horizontal shift register is controlled by the signal generator 7 which will be described later to read out the charges of a predetermined column of the storage array 2. The number of horizontal shift registers may be two or four or more. A reference character $T_1$ is a gate provided between the storage array 2 and the horizontal shift register 31; $T_2$ is a gate provided between the registers 31 and 32; and $T_3$ is a gate between the registers 32 and 33, respectively. Numerals 41–43 are output amplifiers for converting the charging signals to be read out from the horizontal shift registers 31–32 into the voltage signals and for reading out, respectively. A character O denotes a distributing section as distributing means for properly distributing the charges of the cells of the storage array 2 to the horizontal shift register.

A reference character $\phi_{120}$ denotes a shift pulse for vertically shifting the charges of the first, fourth, fifth, and eighth columns form the right of the drawing of the storage array 2 (each of these columns is referred to as 201, 204, 205 and 208 hereinafter). Similarly, $\phi_{121}$ is a shift pulse for vertically shifting the charges of the 2nd, 3rd, 6th and 7th columns from the right of the drawing (each column is referred to as 202, 203, 206, and 207 hereinbelow); $\phi_T$ is a gate pulse for controlling the gates T1–T3 and the distributing section O; $\phi_{31}$–$\phi_{33}$ are shift pulses for horizontally shifting the charges of the horizontal shift register 31–33, respectively. These pulses are supplied from the signal generator 7 which will be described later.

Figure 10:
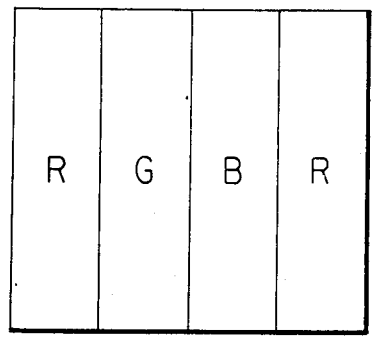
FIG. 10 is a diagram of an embodiment of a color separation filter.

A color separation filter, for example, as shown in FIG. 10 is attached onto the surface of the image pickup array 1.

In FIG. 10, reference chracters R, B and G represent color filters for passing the red, blue and green lights, respectively. Each of these color filters is arranged so as to introduce the color light corresponding to each column of the image pickup array. Of course, the color pattern of the color separation filter is not limited to this pattern of FIG. 10.

Figure 11:
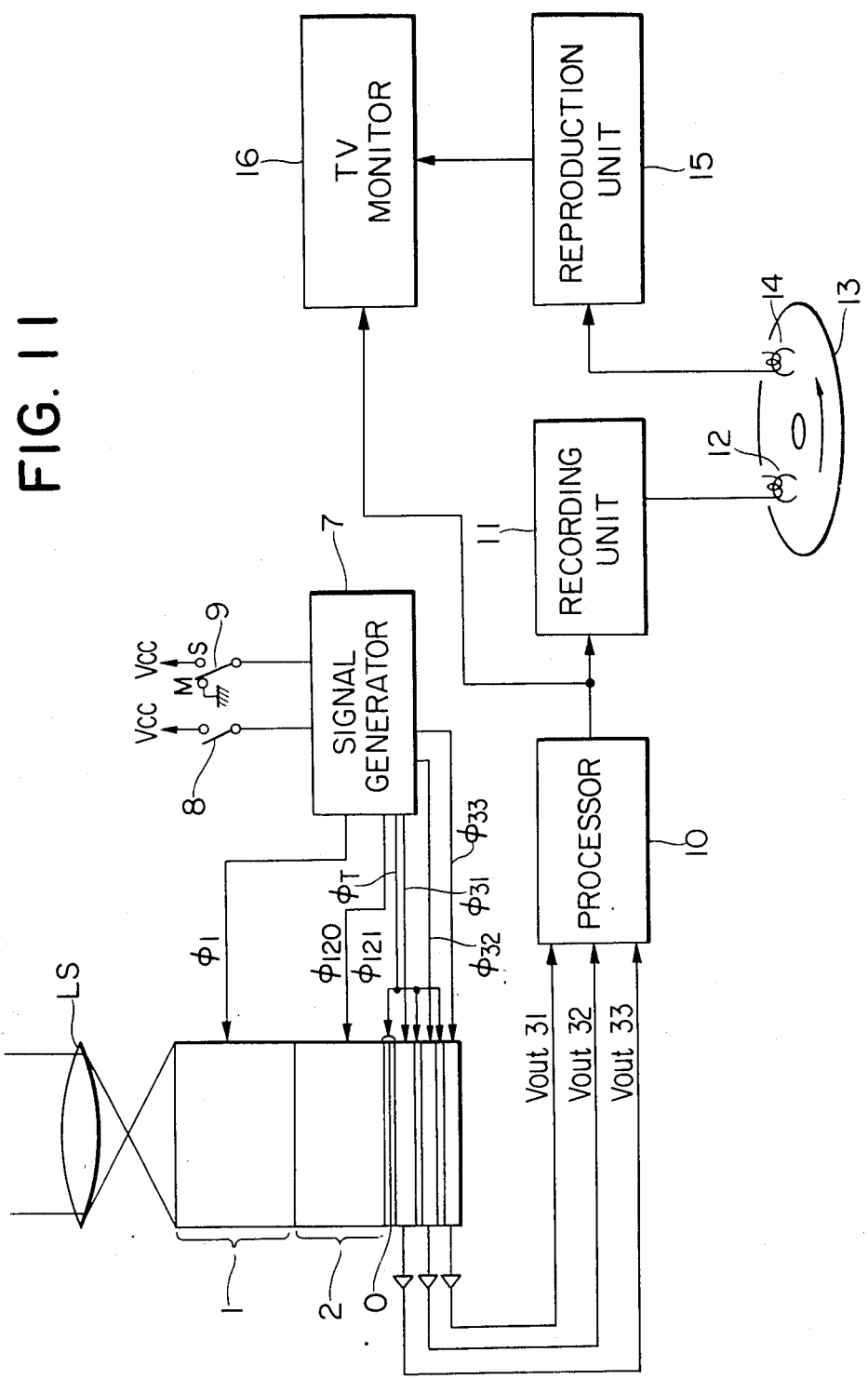
FIG. 11 is a schematic diagram showing an image pickup, recording and reproducing apparatus using the image pickup device shown in FIG. 9.
Figure 12:
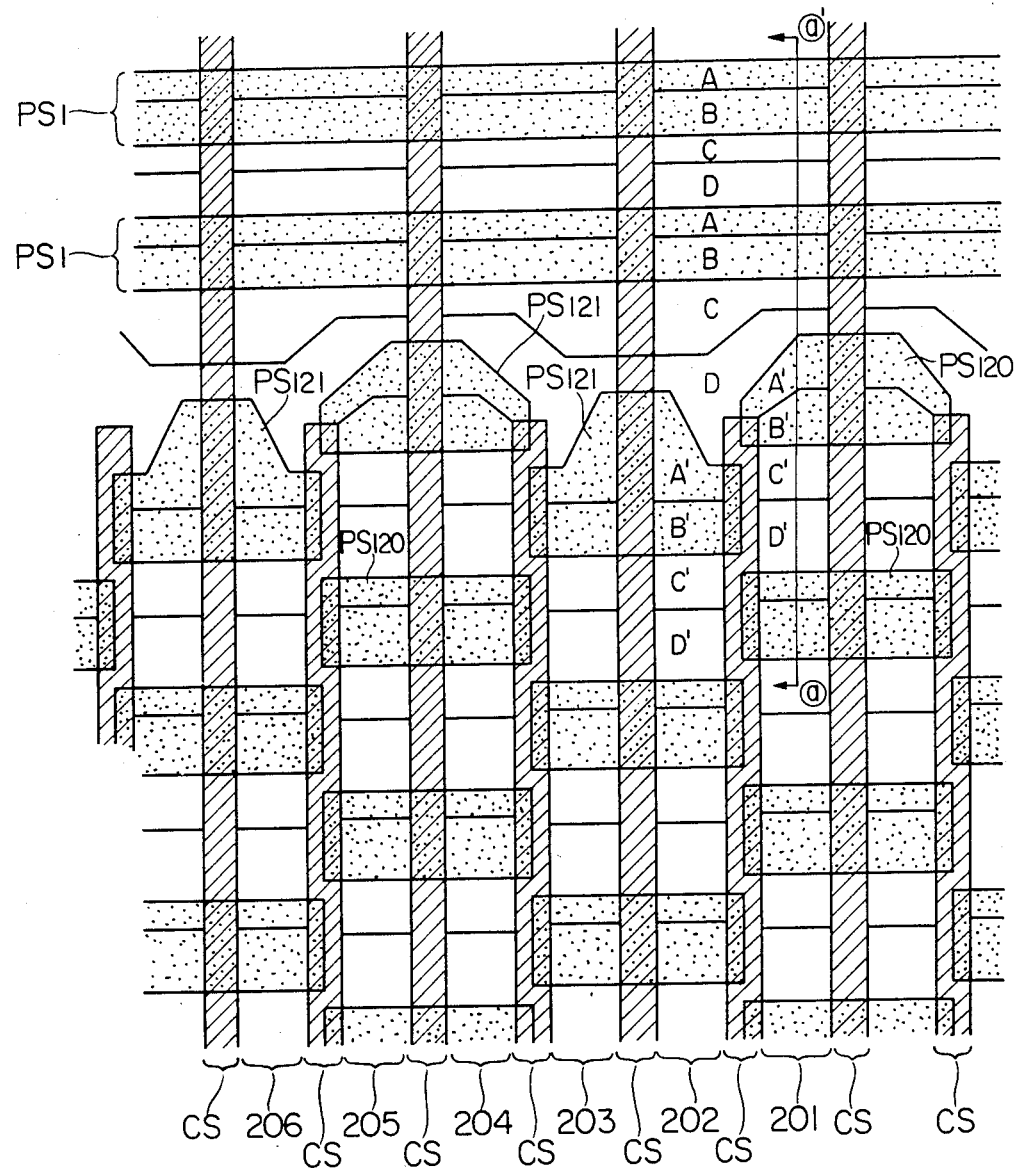
FIG. 12 shows an electrode pattern diagram near the boundary between the image pickup array and the storage array of the device shown in FIG. 9.
Figure 13:
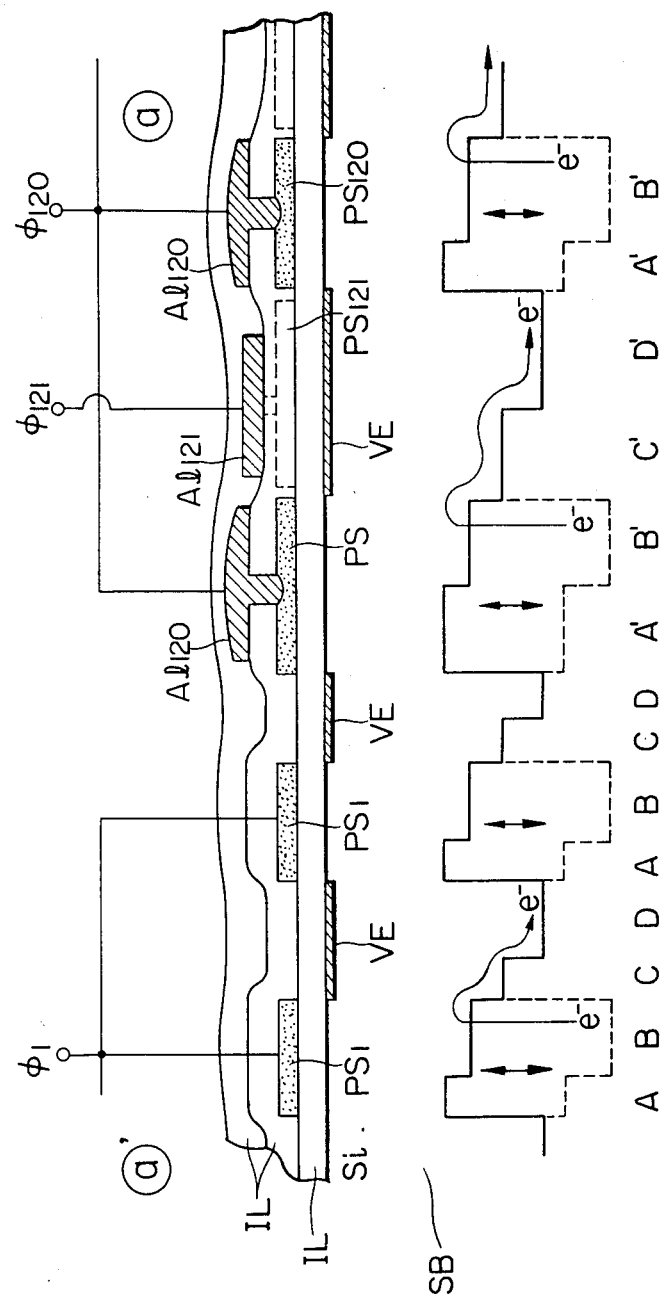
FIG. 13 is a diagrammatical view showing the potentials in the cross section taken along the line ⓐ-ⓐ' of FIG. 12.
Figure 14:
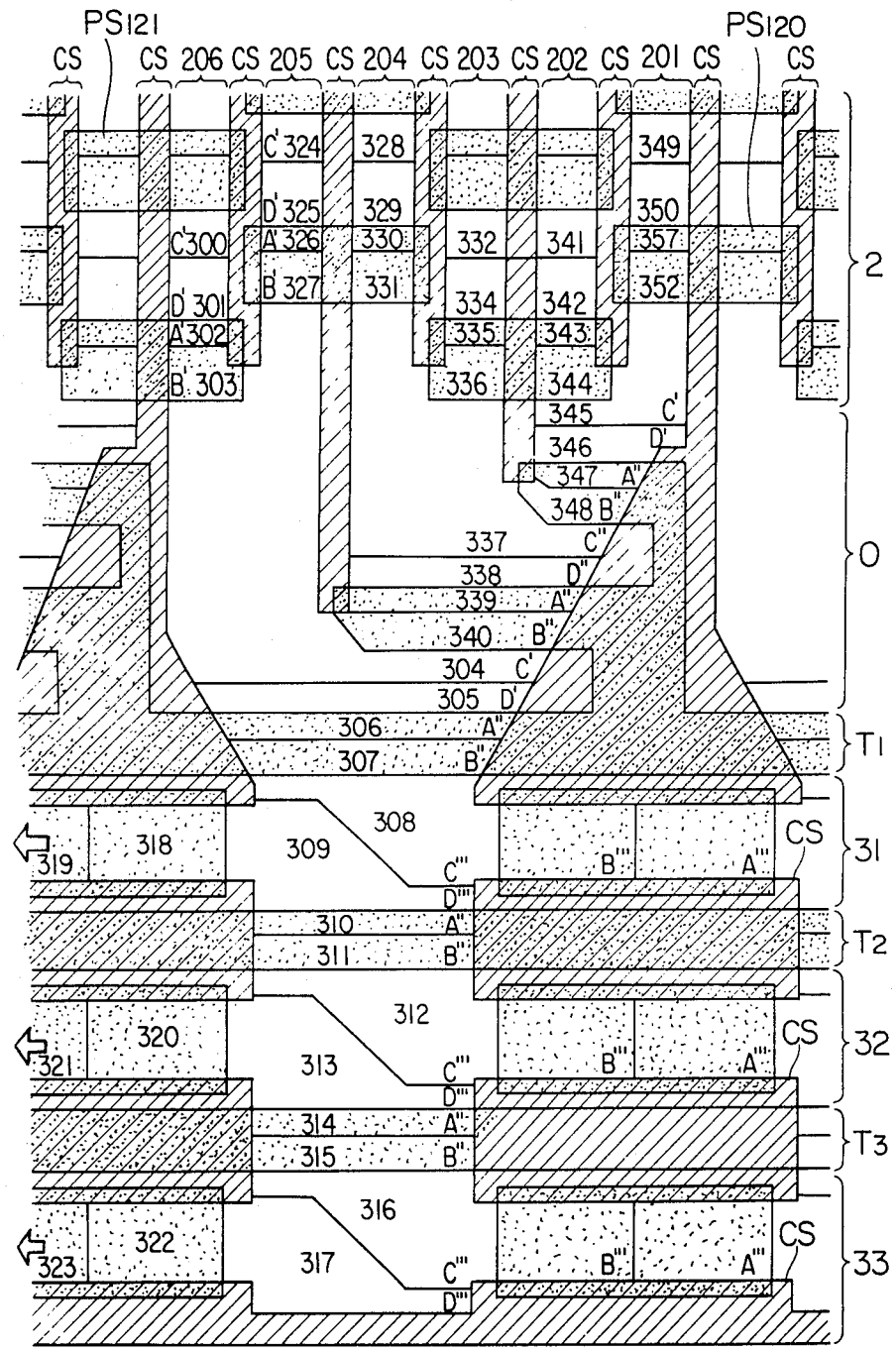
FIG. 14 shows an electrode pattern diagram near the boundary between the storage array and the horizontal shift register of the device shown in FIG. 9.

FIG. 11 is a diagram showing the construction of the image pickup, recording and reproducing apparatus using the image pickup device of the present invention, in which the same elements as those shown in FIG. 3 are designated by the same reference numerals. The signal generator 7 to be activated by the operation of the image pickup trigger switch 8 produces the signals with the timings as shown in FIG. 12 or FIGS. 13 and 14 in response to each mode of the still (S) or movie (M) of the mode selecting switch 9. After the signal processings of sampling and holding, γ correction, aperture correction, etc. were carried out in the processor 10 for video signals Vout 31–Vout 33 obtained through the output terminal of the image pickup device, those signals are recorded on the recording medium 13 through the recording unit 11 for performing the modulation and the like,.and the recording head 12. A reference character LS denotes an image formation optical system for introducing the light reflected from a subject to be photographed to the image pickup array 1, thereby to form the image.

FIG. 12 is a diagrammatical view of the electrode pattern near the boundary between the image pickup array 1 and the storage array 2 of the device shown in FIG. 9, in which an example of the single-phase drive is illustrated. As already described, CS denotes the channel stopper and PS1 is a poly-silicon electrode for supplying the pulse $\phi_1$ to the image pickup array 1, this electrode covers the surfaces of the regions A and B having different potential levels in the semiconductor substrate.

In addition, electrodes PS120 and PS121 cover the surfaces of the regions A' and B' having different potential levels in the storage array. These electrodes serve to apply pulses $\phi_{120}$ and $\phi_{121}$ to each column of the storage array 2.

The regions C and D of the image pickup array and the regions C' and D' in the storage array are virtual electrode regions each having a respective fixed potential level which is formed in the semiconductor substrate due to the ion implatation or the like.

In the case of this embodiment, one cell is formed by regions A, B, C, D, or A', B', C', D'.

The potential levels P(A), P(B), P(C), P(D), P(A'), P(B'), P(C'), and P(D') for electrons of each of the regions A, B, C, D, A', B', C', and D' have the same relations as those of the potential levels in the embodiment of FIG. 7.

In this embodiment of the present invention, each cell of the storage array 2 is wired so as to apply common voltages to two predetermined adjacent cells at a time. That is to say, the electrodes PS120 and PS121 are arranged for predetermined two adjacent cells, respectively. The fellow electrodes PS120 and the fellow electrodes PS121 are respectively commonly connected.

Therefore, this arrangement allows the device to be simply manufactured since the electrodes for controlling the potentials of each cell can be enlarged. In addition, the wiring pattern is also simplified. Thus, the yield can be improved.

Furthermore, in this embodiment, part of the cells of the storage array are arranged in such a manner that they are vertically shifted against i.e., in a position vertically displaced from the remaining cells; therefore, in the case where the electrodes PS120 and PS121 are separately connected, the same fellow electrodes can be horizontally coupled. Consequently, for example, it is possible to couple the electrodes PS120 by the horizontal comb-tooth-like wiring pattern of which the right side in the drawing is commonly connected. On the other hand, by arranging the electrodes PS121 in the gaps of the above-mentioned comb-tooth, they can be coupled by the comb-tooth-like wiring pattern of which the left side is commonly connected. Thus, the manufacturing process of the device can be simplified.

FIG. 13 is a diagrammatical view illustrating the cross section taken along the ⓐ–ⓐ' in FIG. 5 to describe the states of such potential levels, in which the solid line indicates the state when the low-level signals are applied to each electrode and the broken line represents the state when the high-level signals are applied thereto. Each of the virtual electrode regions C, D, C', and D' are always maintained to be a fixed potential.

In the drawing, a reference character IL denotes an insulating layer such as $SiO_2$ (silicon dioxide); SB is a semiconductor substrate such as Si (silicon); VE is a virtual electrode; and Al120 and Al121 are aluminum wirings for applying the pulses $\phi_{120}$ and $\phi_{121}$ to the electrodes PS120 and PS121, respectively.

Hence, for example, when the clock $\phi_1$ or the clocks $\phi_{120}$ and $\phi_{121}$ are dropped to the low level after they were once raised to the high level, the charges accumulated mainly in the region B are transferred to the region D as shown in the drawing at this trailing edge. Namely, the charges are transferred from B to D or from B' to D' at the trailing edges of the clocks to each electrode.

In addition, the charges in the region D or D' are transferred to the region B or B' by raising each electrode to the high level. That is, the charges are transferred from D to B or from D' to B' at the leading edge of the clock.

The image pickup device of this embodiment of the present invention is constructed in such a manner as described above; therefore, by alternately supplying the clocks $\phi_{120}$ and $\phi_{121}$ synchronously with the clock $\phi_1$, the information of each row of the image pickup array of FIG. 12 is distributed to a predetermined column of the storage array.

Referring to FIG. 14, there is shown an example of the electrode arrangement of the electrode pattern near the boundary of the horizontal shift registers 31-33 and the storage array 2 of the image pickup device shown in FIG. 9, in which the same elements as those shown in FIG. 12 are designated by the same reference numerals.

If the same voltages are applied to each electrode, the potential levels P(A''), P(B''), P(C''), P(D''), P(A'''), P(B'''), P(C'''), and P(D''') against the electrons of the regions A'', B'', C'', D'', A''', B''', C''' and D''' satisfy the following expressions.

$$P(A) = P(A'') = P(A''')$$

$$P(B) = P(B'') = P(B''')$$

$$P(C) = P(C'') = P(C''')$$

$$P(D) = P(D'') = P(D''')$$

Each one cell is formed by the combination of A'', B'', C'', D'', or the combination of A''', B''', C''', D'''.

As shpwn in FIG. 14, in the case where the storage array and a plurality of horizontal shift registers are coupled, the distributing section O is provided and the cells near the boundary between the storage array and the horizontal shift registers are vertically shifted and arranged in this distributing section O; therefore, when the charges in each cell of the storage array are distributed to each horizontal shift register, there is no need to three-dimensionally cross the fellow electrodes, thereby making the device strong against noises and also simplifying the manufacturing process. Namely, the distributing section O is constituted by the lowest row of the storage array and the gate electrode T₁ or the like. This section O converts the charges of a plurality of columns in the same row which were vertically transferred in the storage array with the same timing into the time-series-like signals of one column by applying predetermined different delay times every predetermined column, thereby sequentially storing these singals into the horizontal shift registers. In other words, this distributing section O is parallel/serial converting means for transferring in series the charges which were transferred in parallel.

In this embodiment, the parallel/serial conversion is performed by the gate electrode T₁ in the distributing section. However, the distributing section may be formed by constituting the device in such a manner that the lengths of the vertical transfer channels of each column of the storage array 2 are merely set to values which are slightly different from each other and that the information of a plurality of columns is introduced to the cells of one column. The present invention incorporates such an arrangement.

In this embodiment, part of the cells of the storage array 2 are vertically shifted against the other cells; however, the construction of the distributing section is not limited to such a construction of the storage array. For example, such a construction of the storage array as shown in FIG. 14 may be applied.

The operation will now be described.

Figure 15:
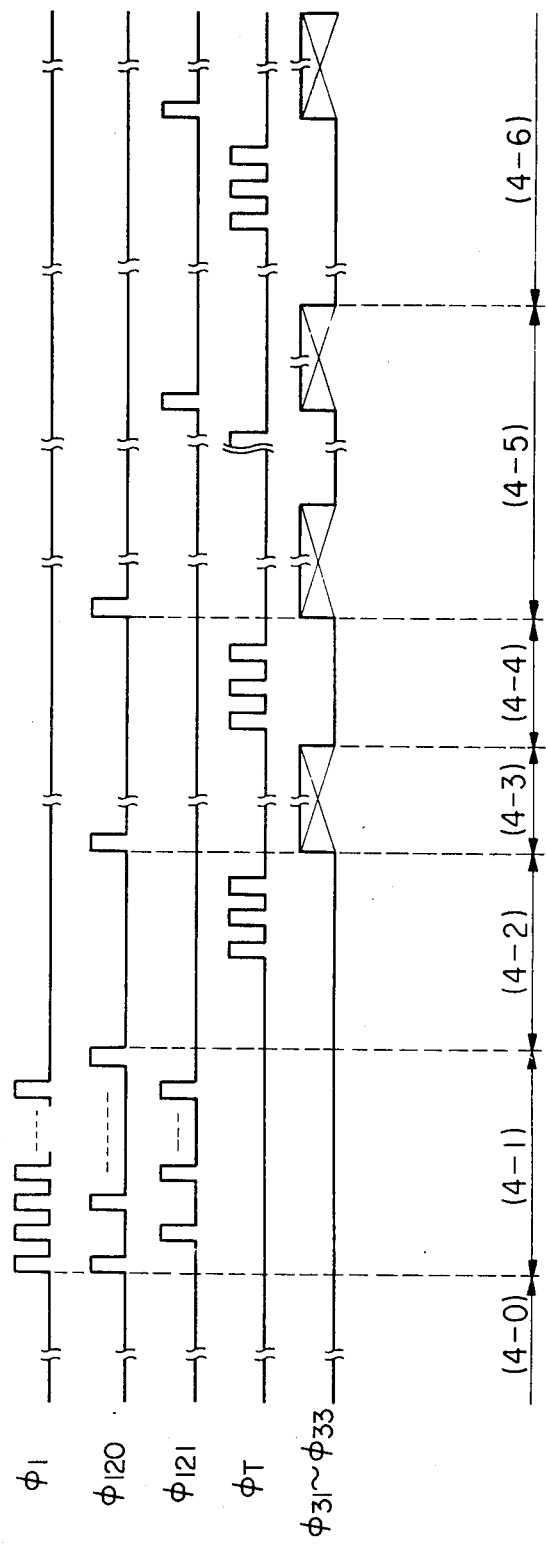
FIG. 15 is a timing chart in the still mode of the apparatus shown in FIG. 11.

FIG. 15 is a diagram showing an example of the output timing of the signal generator 7 with the construction shown in FIG. 11. In FIG. 15, as described previously, the pulses $\phi_1$, $\phi_{120}$, $\phi_{121}$, $\phi_{31}$-$\phi_{33}$, and $\phi_T$ are constituted in such a manner that when they are at the high level, the potential levels of each picture element in the image pickup device are lowered against the electrons and that when they are at the low level, the potential levels are raised. When the image pickup trigger switch 8 is operated, the high-speed pulses $\phi_1$, $\phi_{120}$, $\phi_{121}$, and $\phi_T$, and $\phi_{31}$-$\phi_{33}$ are first supplied, thereby to drain the unnecessary charges.

Then, after a predetermined accumulating time $T_{INT}$ [period (4-0)] passed, the charges of the image pickup array 1 are shifted one row by one at a high speed downward in FIG. 9 by the pulse $\phi_1$ in the period (4-1).

The information of the rows bearing odd numbers among the information of each row to be shifted at this time is transferred to the columns 201, 204, 205, and 208 by the pulse $\phi_{120}$ as described previously, and the information of the rows bearing even numbers is transferred to the columns 202, 203, 206, and 207 and are accumulated by applying the pulse $\phi_{121}$. In this way, the information of one frame of the image pickup array is distributed and is transferred to the storage array. This state is shown in FIG. 9.

In this state, the charges of the lowest row of the storage array in FIG. 9 are accumulated in wells 301, 305, 334, 338, 342, and 346 in FIG. 14.

The charges accumulated in each of these wells are considered with respect to the correspondence to the charges B3, A3, A2, B2, B1, and A1 of FIG. 9.

That is to say, since the stripe color separation filter shown in FIG. 11 is provided, B3 and A3 indicate the charges corresponding to green, A2 and B2 shows the charges corresponding to blue, and B1 and A1 denote the charges corresponding to red.

Next, the information accumulated in the columns 205, 204 and 201 among the information accumulated in the storage array 2 through the above-described process is read out by the pulses $\phi_{120}$, $\phi_{31}$-$\phi_{33}$ and $\phi_T$.

Namely, in the period (4-2), the charges in the wells 305, 338 and 346 are sequentially vertically shifted first by supplying the three pulses $\phi_T$, and they are finally accumulated in the wells 317, 313 and 309, respectively.

Next, the charges accumulated in the wells 317, 313 and 309 are horizontally shifted to the left in FIG. 14 by supplying the high-speed pulses as the pulses $\phi_{31}$-$\phi_{33}$ while keeping the pulse $\phi_T$ at the low level in the period (4-3). The total period of (4-2) and (4-3) is set into, e.g., one horizontal period (1H). Thus, the signal of the first row of the images accumulated in the image pickup array 1 in the period (4-0) is read out in the period (4-3).

The charges in the wells 325, 329 and 350 in FIG. 14 are accumulated in the wells 305, 338 and 346, respectively, by applying one pulse $\phi_{120}$ in this period (4-3).

Therefore, in the period (4-4), the charges in the wells 305, 338 and 346 are accumulated in the horizontal shift registers 33, 32 and 31 similarly in the period (4-2) by supplying three pulses $\phi_T$.

In the following period (4-5), by repeating the similar sequence, the charges in the columns 205, 204, 201, etc., i.e., only the charges corresponding to the rows bearing odd numbers of the image pickup array 1 are sequentially read out. The total period of these periods (4-1) to (4-5) is set into just one vertical period. Next, in the one vertical peirod (4-6), the charges of the columns 206, 203, 202, etc. are sequentially and similarly read out one row by one by the pulses $\phi_{121}$, $\phi_T$, and $\phi_{31}-\phi_{33}$.

As described above, in the still mode of the third embodiment of the present invention, the signals of the two fields which were simultaneously formed in the image pickup array are sequentially interlaced one field at a time and can be read out and, therefore, it is possible to obtain the still image signal with high resolution and at a relatively low frequency but without a blur.

Figure 16:
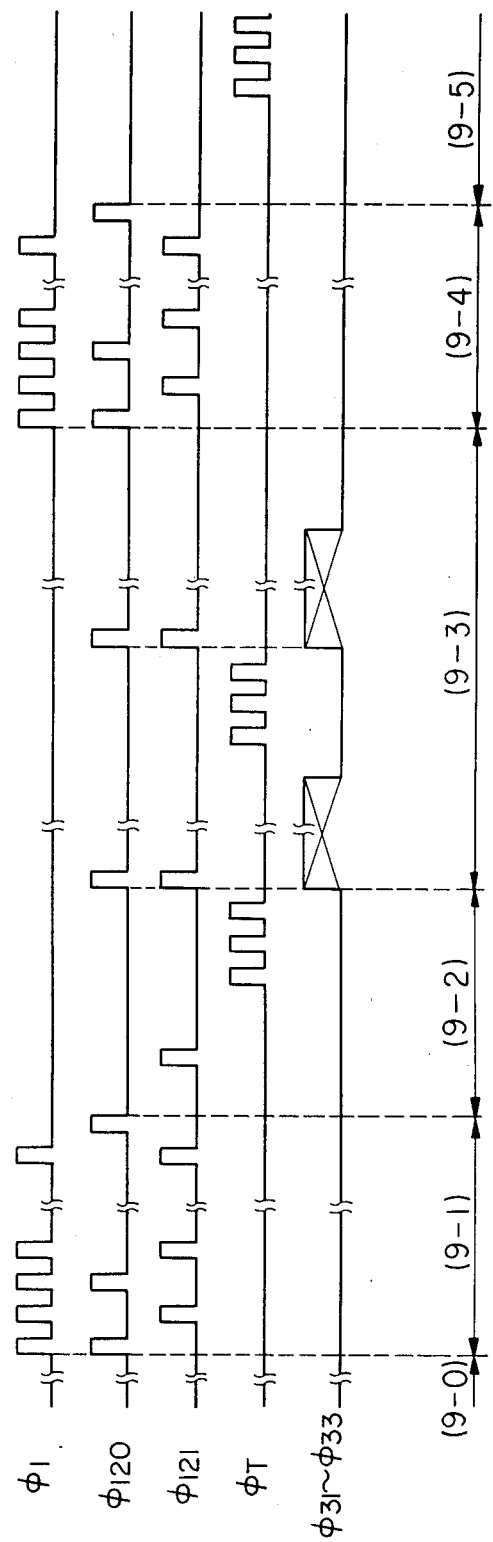
FIG. 16 is a timing chart as a first example in the movie mode of the apparatus of FIG. 11.

Referring next to FIG. 16, there is shown a timing chart of the output pulses of the signal generator in the case where the switch 9 shown in FIG. 11 is switched over on the movie image pickup mode (M) side. In the period (9-1) of FIG. 15, the information of the rows bearing odd numbers of the image pickup array is accumulated in the columns 201, 204, 205, and 208 and the information of the rows bearing even numbers is accumulated in the columns 202, 203, 206, and 207 in the same manner as in the period (4-1) of FIG. 15. In the period (9-2), the charges of the wells 305 and 301, 338 and 334, and 346 and 342 are respectively added by applying one pulse $\phi_{121}$ first. Namely, the charges B3 and A3, A2 and B2, and A1 and B1 of FIG. 9 are added and then three pulses $\phi_T$ are applied to take the charges in the registers 33-31.

Next, in the period (9-3), those charges are horizontally transferred by applying the pulses $\phi_{31}-\phi_{33}$, and the charges D3 and C3, C2 and D2, and D1 and C1 of FIG. 9 are added by applying each one pulse of the pulses $\phi_{120}$ and $\phi_{121}$, respectively. Thereafter, this sequence is repeated to obtain one field signal. The total period of the periods (9-1) to (9-3) is set into one vertical period.

Thereafter, in the period (9-4), the information of the image pickup array is again transferred to the storage array, so that the charging singals which have been formed in the image pickup array during the period from (9-2) to (9-3) are distributed and are accumulated in the same manner as in the period (9-1).

Thereafter, in the period (9-5), this accumulated information is added and is read out. However, at this thime, the combination of the charge information to be added is changed by shifting the pulses 100 $_{120}$ and $\phi_{121}$ by one pulse.

That is to say, different from the period (9-2), since in the pulse $\phi_{121}$ a preceded one pulse is not output, so that (A1-A3) of the iamge pickup array is read out as it is without being added, and (B1-B3) and (C1-C3), (D1-D3) and (E1-E3), and (F1-F3) and (G1-G3) are respectively added and are read out as the one-row information. (H1-H3) is finally read out as the one-row information.

Therefore, there is a mutually interlaced relation between the signals to be read out in the periods (9-2) and (9-3) and the signal to be read out in the period (9-5). Moreover, since the information of the two rows is added, the sensitivity of the device is also improved.

FIG. 17 is a diagram showing the second embodiment of the timings for reading out the signal in the movie mode.

In this embodiment, the readout operation is done at the boundary between the image pickup array and the storage array when the charging signal of the rows bearing even and odd numbers are added.

The charges which were accumulated in the image pickup array in the period (10-1) are transferred to the image pickup array 2 by the pulses $\phi_1$, $\phi_{120}$ and $\phi_{121}$ in the period (10-2). At this time, the added charges are almost equally transferred to each one pair of columns of the storage array by simultaneously applying each one pulse of $\phi_{120}$ and $\phi_{121}$ for every two pulses $\phi_1$. By first applying each one pulse of $\phi_{120}$ and $\phi_{121}$ in the period (10-3), the charges of the columns 206 and 205 are collected and added in the well 305 of FIG. 14; the charges of the columns 204 and 203 are collected and added in the well 338; and the charges of the columns 202 and 201 are collected and added in the well 346. Thereafter these charges are transferred to the horizontal shift registers 31-33 by applying the pulse $\phi_T$ and are further holyzontally read out by applying the pulses $\phi_{31}-\phi_{33}$. After that, by applying each one pulse of $\phi_{120}$ and $\phi_{121}$ every 1H, the same readout operation is repeated, thereby sequentially reading out the added outputs.

Next, when the charges accumulated in the image pickup array in the periods (10-3) and (10-4) are again vertically transferred in the period (10-5), the generating timings of the pulses $\phi_{120}$ and $\phi_{121}$ are shifted forwardly by only one pulse $\phi_1$ different from the case of the period (10-2), so that the combination of the charges to be added near the boundary between the iamge pickup array and the storage array is shifted by one row, thereby obtaining the interlace effect.

After the period (10-6), the readout operation is performed in the same manner as in the periods (10-3) and (10-4).

As described above, since the added outputs are controlled such that they are once divided and are accumulated in each cell even when the capacity of each cell of the storage array is small, the charges will not overflow in the storage array.

Furthermore, in the third embodiment, a plurality of horizontal shift registers are provided and the distributing section is provided between the storage array and the horizontal shift registers in order to distribute the information of a predetermined column of the storage array in a predetermined corresponding horizontal shift register. Therefore, the horizontal readout frequency can be lowered, resulting in an improvement of the transfer efficiency and causing the signal processing to be easily carried out.

Additionally, in the present invention, electrodes each for commonly controlling each predetermined two adjacent cells of the storage array are provided, and a signal generator for forming the control signals to distribute the signals of predetermined cells of the image pickup array to the corresponding cells of the storage array is provided. Therefore, it is possible to obtain the image pickup arrangemnt which can separate and accumulate the information of one screen which was once formed as the interlaced signals of two fields.

Moreover, in the image pickup device of the frame transfer type, predetermined cells of the storage array are arranged by vertically shifting against the other cells, and the signal generator for supplying the independent control signals to each of the predetermined cells and the other cells is provided. Thus, the mutually interlaced signals of two fields can be obtained from the image pickup signal of one time, and at the same time even in the image pickup operation of a moving image, the signals of each field can be mutually interlaced. Additionally, in this case, the image pickup arrangement which can also improve the sensitivity can be provided.

In addition, in the image pickup arrangement using the image pickup device of the frame transfer type, there is provided an image pickup device of the frame transfer type which has: an image pickup array; a storate array having cells in which the number of horizontal cells is twice or more times the number of cells of the image pickup array; a plurality of horizontal shift registers for reading out the information of the cells of the storage array; and a distributing section, provided between the storage array and the horizontal shift registers, for distributing the information of predetermined cells of the storage array to each horizontal shift register. There is also provided a signal generator for controlling the distirbuting section in such a manner as to distribute the information of predetermined vertical cells of the storage array to the corresponding horizontal shift register. Therefore, the horizontal transfer frequency can be lowered and the signals read out can be easily sampled and held. Furthermore, since the clock pulse frequency is lowered, the power consumption of the signal generator can be also saved.

What we claim is:

1. An image pickup device of the frame transfer type comprising:
   (a) an image pickup array consisting of a plurality of photoelectric converting cells which form rows and columns;
   (b) a storage array which consists of a plurality of charge accumulating cells forming rows and columns and is shielded against the light, the number of columns of said storage array being two or more times the number of columns of said image pickup array; and
   (c) register means for sequentially reading out the charges of each row of said storage array.

2. An image pickup device according to claim 1, wherein the number of rows of said storage array is about one half of the number of rows of said image pickup array.

3. An image pickup device according to claim 1, further including gate means, provided between said image pickup array and said storage array, for selectively introducing the charges of a predetermined column of the image pickup array to a predetermined column of the storage array.

4. An image pickup device according to claim 1, wherein said register means includes a plurality of horizontal shift registers.

5. An image pickup device according to claim 4, wherein each of said horizontal shift registers serves to read out the charges of one or more predetermined columns of the storage array, respectively.

6. An image pickup device according to claim 5, further including distributing means for distributing the charges of each column of the storage array to each of said horizontal shift registers.

7. An image pickup device according to claim 5, wherein said predetermined columns are selected as alternate columns from the columns of said storage array.

8. An image pickup device according to claim 1, further including a plurality of electrodes each of which is common to each predetermined two adjacent cells of the storage array and which are separated from one another and which control the potentials of each cell.

9. An image pickup device according to claim 1, wherein said register means reads out the selected charges of the rows of said storage array.

10. A device according to claim 9, wherein said register means includes a plurality of horizontal shaft registers.

11. A device according to claim 10, wherein said predetermined column is selected as every other column, from the columns of said storage array.

12. A device according to claim 9, wherein each of said horizontal shift registers serves to read out the charges of a predetermined column of the storage array, respectively.

13. A device according to claim 9, wherein said register means reads out the selected charges of the rows of said storage array.

14. An image pickup device according to claim 1, wherein selected cells of said storage array are arranged at a position displaced from the other cells of said storage array in a vertical direction.

15. An image pickup device of the frame transfer type comprising:
   (a) an image pickup array consisting of a plurality of photoelectric converting cells which form rows and colmns;
   (b) a storage array which consists of a plurality of charge accumulating cells forming rows and columns and is shielded against the light, said storage array having a plurality of electrodes each of which is common to each predetermined two adjacent charge accumulating cells and which are separated from one another and which control the potential of each cell; and
   (c) register means for sequentially reading out the charges of each row of said storage array.

16. An image pickup device of the frame transfer type comprising:
   (a) an image pickup array consisting of a plurality of photoelectric converting cells which form rows and columns;
   (b) a storage array which consists of a plurality of charge accumulating cells forming rows and columns and is shielded against the light, selected ones of said charge accumulating cells being arranged at a position displaced from the other charge accumulating cells of said storage array in a vertical direction; and
   (c) register means for sequentially reading out the charges of each row of said storage array.

17. An image pickup device according to claim 16, further including electrodes each of which is common to each predetermined two adjacent charge accumulating cells and which are separated from one another, and which control the potential of each charge accumulating cell.

18. An image pickup arrangement comprising:
(a) an image pickup device including
  (i) an image pickup array having a plurality of photoelectric converting cells forming rows and columns and electrodes for controlling said cells,
  (ii) a storage array which consists of a plurality of charge accumulating cells forming rows and columns and electrodes for controlling said cells and is shielded against the light, the number of columns of said storage array being twice or more times the number of columns of said image pickup array, and
  (iii) register means for sequentially reading out the charges of each row of the storage array; and
(b) a signal generator for applying to each electrode control signals to distributing the charges of a pretermined column of said image pickup array to a predetermined column of said storage array.

19. An image pickup arrangement comprising:
(a) an image pickup device including
  (i) an image pickup array consisting of a plurality of photoelectric converting cells which form rows and columns,
  (ii) a storage array which consists of a plurality of charge accumulating cells forming rows and columns and is shielded against the light, the number of columns of said storage array being twice or more times the number of columns of said image pickup array,
  (iii) register means for sequentially reading out the charges of each row of said storage array, and
  (iv) gate means, provided between said image pickup array and said storage array, for selectively introducing the charges of a predetermined column of the image pickup array to a predetermined column of the storage array; and
(b) a signal generator for producing control signals to distribute the charges of a predetermined column of the image pickup array to a predetermined column of the storage array by said gate means.

20. An image pickup arrangement comprising:
(a) an image pickup device including
  (i) an image pickup array consisting of a plurality of photoelectric converting cells which form rows and columns,
  (ii) a storage array which consists of a plurality of charge accumulating cells forming rows and columns and is shielded against the light, said storage array having a plurality of electrodes each of which is common to each predetermined two adjacent charge accumulating cells and which are separated from one another and which control the potential of each cell, and
  (iii) register means for sequentially reading out the charges of each row of said storage array; and
(b) a signal generator for selectively and vertically transferring the charges of a predetermined column of the storage array by independently contolling said plurality of electrodes, respectively.

21. A device of the frame transfer type comprising:
(a) an image pickup array including a plurality of photoelectric converting cells which form rows and columns;
(b) a storage array including a plurality of charge storing cells which form rows and columns, at least two columns of the storage array dividing a signal from a single column of said image pickup array into two parts and storing the respective parts; and
(c) register means for substantially reading out the charges of each row of said storage array.

22. A device according to claim 21, wherein the number of rows of said storage array is about one half of the number of rows of said image pickup array.

23. A device according to claim 21, further including gate means, provided between said image pickup array and said storage array, for selectively introducing the charges of a predetermined column of the image pickup array to a predetermined column of the storage array.

* * * * *

UNITED STATES PATENT AND TRADEMARK OFFICE
CERTIFICATE OF CORRECTION

PATENT NO. : 4,635,122
DATED : January 6, 1987
INVENTOR(S) : TOSHIO KATO ET AL.

It is certified that error appears in the above-identified patent and that said Letters Patent is hereby corrected as shown below:

COLUMN 1

Line 6, "Ser" should read --Ser.--.

COLUMN 2

Line 45, "FIG. 9; is" should read --FIG. 9 is--.

COLUMN 3

Line 39, "which according" should read --which, according--.
    Line 54, "0" should read --O--.

COLUMN 4

Line 40, "off-number" should read --odd-number--.

COLUMN 5

Line 2, "of 0" should read --of the O--.
    Line 47, delete "such".

COLUMN 6

Line 2, "0" should read --O--.
    Line 55, "0" should read --O--.

COLUMN 7

Line 1, "diretion" should read --direction--.
    Line 8, "bers," should read --bers.--.
    Line 27, "form" should read --from--.
    Line 33, "$\phi_T$is" should read --$\phi_T$ is--.

UNITED STATES PATENT AND TRADEMARK OFFICE
CERTIFICATE OF CORRECTION

PATENT NO. : 4,635,122

DATED : January 6, 1987

INVENTOR(S) : TOSHIO KATO ET AL.

It is certified that error appears in the above-identified patent and that said Letters Patent is hereby corrected as shown below:

COLUMN 7

Line 34, "T1-T3" should read --$T_1$-$T_3$--.

COLUMN 8

Line 9, "1, this" should read --1. This--.
Line 11, "semidonductor" should read --semiconductor--.
Line 22, "implatation" should read --implantation--.
Line 59, "the ⓐ-ⓐ' " should read --the line ⓐ-ⓐ'--.

COLUMN 9

Line 46, "shpwn" should read --shown--.
Line 64, "singals" should read --signals--.

COLUMN 10

Line 52, "shows" should read --show--.
Line 66, "$\phi$Tat" should read --$\phi$T at--.

COLUMN 11

Line 16, "peirod" should read --period--.
Line 40, "$\phi$Tare" should read --$\phi$T are--.
Line 52, "singals" should read --signals--.
Line 58, "thime," should read --time,--.
Line 59, "$100_{120}$" should read --$\phi$ 120--.
Line 63, "iamge" should read --image--.

UNITED STATES PATENT AND TRADEMARK OFFICE
CERTIFICATE OF CORRECTION

PATENT NO. : 4,635,122
DATED : January 6, 1987
INVENTOR(S) : TOSHIO KATO ET AL.

Page 3 of 4

It is certified that error appears in the above-identified patent and that said Letters Patent is hereby corrected as shown below:

COLUMN 12

Line 27, "$\phi$Tand" should read --$\phi$T and--.
    Line 28, "holyzontally" should read --horizontally--.
    Line 40, "iamge" should read --image--.
    Line 68, "arrangemnt" should read --arrangement--.

COLUMN 13

Lines 19-20, "stor-/ate" should read --storage--.
    Line 29, "distirbuting" should read --distributing--.

COLUMN 14

Line 18, "shaft" should read --shift--.
    Line 39, "colmns;" should read --columns;--.

COLUMN 15

Line 17, "to" should read --for--.
    Lines 17-18 "pret-/ermined" should read --predetermined--.

UNITED STATES PATENT AND TRADEMARK OFFICE
CERTIFICATE OF CORRECTION

PATENT NO. : 4,635,122

DATED : January 6, 1987

INVENTOR(S) : TOSHIO KATO ET AL.

It is certified that error appears in the above-identified patent and that said Letters Patent is hereby corrected as shown below:

COLUMN 16

Line 20, "contolling" should read --controlling--.
    Line 31, "substantially" should read --sequentially--.

Signed and Sealed this

Twenty-eighth Day of April, 1987

Attest:

DONALD J. QUIGG

Attesting Officer    Commissioner of Patents and Trademarks